United States Patent [19]
Warmka et al.

[11] Patent Number: 5,850,320
[45] Date of Patent: Dec. 15, 1998

[54] HEAD-GIMBAL ASSEMBLY WITH REDUCED VERTICAL SPACING ENVELOPE AND ALIGNMENT STRUCTURES

[75] Inventors: Scott Robert Warmka, Richfield; Michael Sweney Lucas, Inver Grove Heights; Tracy Michael Hagen, Edina, all of Minn.

[73] Assignee: Seagate Technology, Inc., Scotts Valley, Calif.

[21] Appl. No.: 854,905

[22] Filed: May 13, 1997

[51] Int. Cl.$^6$ ................................. G11B 5/48; G11B 5/60
[52] U.S. Cl. ................................. 360/104; 360/103
[58] Field of Search ................................. 360/104, 103, 360/106

[56] References Cited

U.S. PATENT DOCUMENTS

| | | | |
|---|---|---|---|
| 3,702,461 | 11/1972 | Cantwell | 360/103 |
| 3,774,183 | 11/1973 | Roscamp | 360/103 |
| 3,931,641 | 1/1976 | Watrous | 360/104 |
| 4,261,024 | 4/1981 | Desserre | 360/104 |
| 4,449,155 | 5/1984 | Meier et al. | 360/104 |
| 4,616,279 | 10/1986 | Poorman | 360/103 |
| 4,953,834 | 9/1990 | Ebert et al. | 267/160 |
| 4,972,280 | 11/1990 | Iwata | 360/104 |
| 5,008,768 | 4/1991 | Carlson et al. | 360/104 |
| 5,079,659 | 1/1992 | Hager | 360/104 |
| 5,126,903 | 6/1992 | Matsuzaki | 360/104 |
| 5,220,471 | 6/1993 | Matsuzaki | 360/103 |
| 5,243,482 | 9/1993 | Yamaguchi et al. | 360/104 |
| 5,299,080 | 3/1994 | Mizuno et al. | 360/104 |
| 5,325,250 | 6/1994 | Nagase | 360/104 |
| 5,331,489 | 7/1994 | Johnson et al. | 360/104 |
| 5,367,419 | 11/1994 | Kazama | 360/104 |

*Primary Examiner*—Craig A. Renner
*Attorney, Agent, or Firm*—Flehr Hohbach Test Albritton & Herbert LLP

[57] ABSTRACT

A head-gimbal assembly supports a transducer proximate a magnetic surface for magnetic recording. This assembly comprises a flexure used in conjunction with a slider having a recess of sufficient depth provided in its top surface such that when a flexure member is set in the recess, and the member is attached during the HGA assembly process, the top of the flexure is flush with or is below the top surface of the slider. The gimbal component of the flexure is further provided with lateral alignment tab(s) to contact an interior wall of the recess, thereby providing alignment of the slider to the gimbal in the lateral direction, and longitudinal alignment tabs to contact the trailing surface of the slider, thereby providing alignment in the longitudinal direction. The slider is further provided with an identifying code on a non-recessed portion of the top surface of the slider such that the code is not obstructed by the flexure in the top plan view.

40 Claims, 6 Drawing Sheets

HEAD-GIMBAL ASSEMBLY WITH REDUCED VERTICAL SPACING ENVELOPE AND ALIGNMENT STRUCTURES

FIELD OF THE INVENTION

This invention relates generally to the field of head-gimbal assemblies [HGA's] that include sliders where read/write transducers are carried proximate rotating magnetic media in hard disc file direct access storage devices, and more specifically, but not by way of limitation, to an HGA that is suited particularly to use with a slider that has wire connection terminals for the transducer on its top surface.

BACKGROUND OF THE INVENTION

The HGA used in a hard disc file consists of three components:

A slider that includes a self-acting hydrodynamic air bearing surface [ABS] and an electromagnetic transducer for recording information on [writing] and retrieving information from [reading] a spinning magnetic disc. The transducer is connected to the disc file's read/write electronics via very small twisted copper wires.

A gimbal that is attached, usually adhesively, to the slider and is resilient in the pitch and the roll directions of the slider as it follows the topography of the disc, and is rigid in the yaw and in the in-plane directions to enable precise slider positioning, and thereby precise transducer positioning, with respect to the disc.

A load beam that is attached to a support arm and to which a gimbal is attached, and is resilient in the vertical direction as the slider follows the topography of the disc, and is rigid in the in-plane directions to enable precise slider positioning, and applies a force that opposes the hydrodynamic lifting force developed by the slider's air bearing when proximate a spinning disc.

It has been common practice to fabricate discretely the load beam and the gimbal and attach them by means of laser welding. This assembly is known generally as a flexure. An example of such a flexure, and its use in a head-gimbal assembly, is presented in U.S. Pat. No. 4,167,765.

The general technology trend of hard disc files is the continual shrinking of their physical dimensions while maintaining or increasing their data storage capacity. This has required smaller components, in particular discs, sliders, and flexures, and it has required reductions in spacing between discs.

The gimbal and the load beam components overlap in flexures of the current art, such as in '765. Therefore, reducing the thickness of the individual gimbal and load beam components is the emphasized means by which the flexure thickness is reduced. To this end, the realization of a unified [contiguous] gimbal and load beam structure has been developed; examples of which are described in Attorney Docket No. SEA 8168, U.S. Ser. No. 07/975,352 filed Nov. 12, 1992 entitled "DISC FILE FLEXURE SUPPORT SERIES"; Attorney Docket No. SEA 8218, U.S. Pat. No. 5,638,234 issued Jun. 10, 1997 entitled "FLEXURE WITH REDUCERS UNLOADED HEIGHT FOR HARD DISC DRIVE HEADS"; and U.S. Pat. No. 5,331,489 issued Jul. 19, 1994 entitled "GIMBAL FOR A FLEXURE FOR TOP-TERMINATED HEADS", all incorporated herein by reference.

The flexure of SEA8168 provides a very low vertical spacing envelope [VSE] under loaded conditions, i.e., the greatest among the vertical distances between the slider's air bearing surface and 1.) the top of the slider, 2.) the top of the flexure, and 3.) the vertical peak of the wire loop when the flexure is installed in a hard disc file. The teaching of SEA8218 describes the importance of a low VSE when the HGA is not loaded and also provides a modification of the flexure of SEA8168 that improves the unloaded VSE.

The flexures of SEA8168 and SEA8218 anticipate the location of the transducer termination points, or bond pads, for the wires to be on the trailing surface of the slider, with respect to the air flow generated by a rotating disc. The wire routing schemes for such flexures provide either of two undesirable conditions as the wires pass from the bond pads to a formed channel along the side of the load beam. In the first case, when loaded in a hard disc file, the wires are routed such that they pass along the side of the slider body and vertically between the rotating disc and the gimbal. This poses a reliability risk in that if the wire loop is adjusted inadvertently to hang below the ABS during the hard disc file assembly process, then it will contact the disc. This will prevent the slider from attaining the desired head-disc spacing and will generate large amounts of contamination, as well as short the wires, as the wire insulation is worn by the disc. In the second case, a large wire loop is created such that the gimbal is between the wires and the disc. However, to do this, the wire loop is so large as to provide a bias moment on the slider's air bearing; such a moment will alter the flying attitude of the slider, thereby altering the head-disc separation, which is undesirable. The loop may also increase dramatically the VSE of the HGA.

The flexure of '489 provides a modification of the flexure of SEA8168 whereby the gimbal allows bond pads on the top surface of the slider and adjacent to the trailing edge. This slider/bond pad configuration is referred to as top bond pad [TBP]. The TBP configuration then allows for the simple automation of the operation that attaches the wire leads to the bond pads. The flexure of '489 also allows a means to position the bond pads on the trailing surface while having a wire routing scheme that is substantially the same as the TBP configuration; this is also knows as the end bond top route [EBTR] configuration.

For both the TBP and EBTR configurations, the wire is routed such that it does not contact the gimbal, thereby maintaining the compliance of the gimbal beams and preventing the fretting or nicking of the wires. However, this can result in a wire loop that has a height comparable to that of the slider's thickness. During the merging of the heads between the discs in the hard disc file assembly process, the wire loop of an HGA can then contact, or become tangled with, the wire loop of the HGA on the opposite facing disc surface, or contact the base of the hard disc file, leading to damage of the HGA or the disc and rendering the hard disc file inoperable. Thus the advantage to the VSE of the reduced thickness flexure is effectively negated.

In HGA's of the current art, it is desirable to achieve a certain alignment between the gimbal and slider. Most gimbals include a well-defined protrusion through which the force applied by the load beam is transmitted to the slider and about which the slider can pitch and roll as it follows the topography of a rotating disc. To achieve a desired fly attitude of the slider with respect to the disc, i.e., fly height, fly pitch, and fly roll, the load bearing protrusion must be located with great accuracy, with respect to the slider. A most common means of alignment uses tooling features referenced to flexure features and slider features. Several tolerances can accumulate to reduce alignment accuracy including those with respect to flexure features, the slider features, the tooling features, referencing the flexure to the tooling, and referencing the slider to the tooling.

The use of sliders with a recessed channel in the top surface, into which a member of the flexure is placed for attachment, is well known in the current art. Examples of such a configuration are provided in U.S. Pat. No. 3,823,416, U.S. Pat. No. 3,931,641, and U.S. Pat. No. 4,219,853. U.S. Pat. No. 4,141,050 and U.S. Pat. No. 4,449,155 present gimbals that include "fingers" that are wedged into such a recessed prismatic channel of the slider and apply an outward force against the interior walls of the channel, thereby providing a means to self-align, and to self-attach, the gimbal to the slider in the direction normal to the channel walls. However, this does not provide a means for aligning the gimbal in the direction parallel to the channel walls. Therefore, an external means of alignment is still required, and a significant reduction in the accumulation of tolerances is not realized. Moreover, the gimbals of '050 and '155 have a tendency to cause the slider to buckle and deform the ABS in an inherently uncontrollable manner, which is undesirable.

U.S. Pat. No. 5,079,659 discloses a gimbal having tabs to accept each of the four corners of the slider, where each tab has an inward force on the slider, thereby providing a means to self-attach the slider and the gimbal and to self-align the slider to the gimbal in both the lengthwise and widthwise directions of the slider; this precludes the need for external tooling to align the slider and the gimbal. However, the gimbal of '659 is not conducive to use with TBP sliders. Also, the tabs must be positioned such that the inward forces are applied in the neutral bending plane to prevent the slider from bending or buckling under the attachment forces, which is problematic in manufacturing.

It is also common in the art to provide each slider with a unique alphanumeric identification code on its leading surface; a most common method laser scribes the code into the slider surface. The code, or slider serial number [S/N], is then used for HGA configuration control, i.e., a means to identify and separate sliders with a specific transducer geometry for use in different products. The S/N also provides a means of tracking test and inspection results of the slider and the HGA during fabrication and assembly.

However, the location of the S/N has ramifications that may negatively affect the quality of the HGA. For example, during the HGA assembly process, it is often necessary to identify individual HGA's, such as during testing. This identification is often done visually, which requires the HGA to be rotated out of plane before the S/N an be read. Such handling increases the risk of damaging the slider or the gimbal such that it is rendered unusable, and it increases the throughput time of the assembly process. Because the leading surface is adjacent to and substantially perpendicular to the bottom surface of the load beam, light is reflected off the load beam surface and onto the leading surface of the slider, which obscures the S/N, thereby reducing the reliability of accurately reading the S/N and further increasing the process throughput. Schemes using optical character recognition [OCR] equipment can be affected similarly.

SUMMARY OF THE INVENTION

It is a principal object of this invention to provide an HGA and wire routing scheme having a vertical spacing envelope that is substantially reduced from existing HGA's and having improved reliability.

It is also an object of this invention to provide an HGA having means of self-alignment to align the gimbal to the slider, thereby precluding the need for additional tooling.

It is a further object of this invention to provide an HGA having reduced variability in the placement of a point of load contact, with respect to the slider center of gravity; the load is provided by the flexure and transmitted to the slider to oppose the hydrodynamic lifting force of the slider ABS.

It is an additional object of this invention to provide an HGA having reduced amounts of loaded and unloaded HGA heights.

It is an additional object of this invention to provide an HGA scheme having a simple means of identifying individual HGA's.

Other features and advantages of the present invention will become apparent to a person of skill in the art who studies the present invention disclosure, given with respect to the following figures.

DETAILED DESCRIPTION OF A PREFERRED EMBODIMENT

Figure 1:
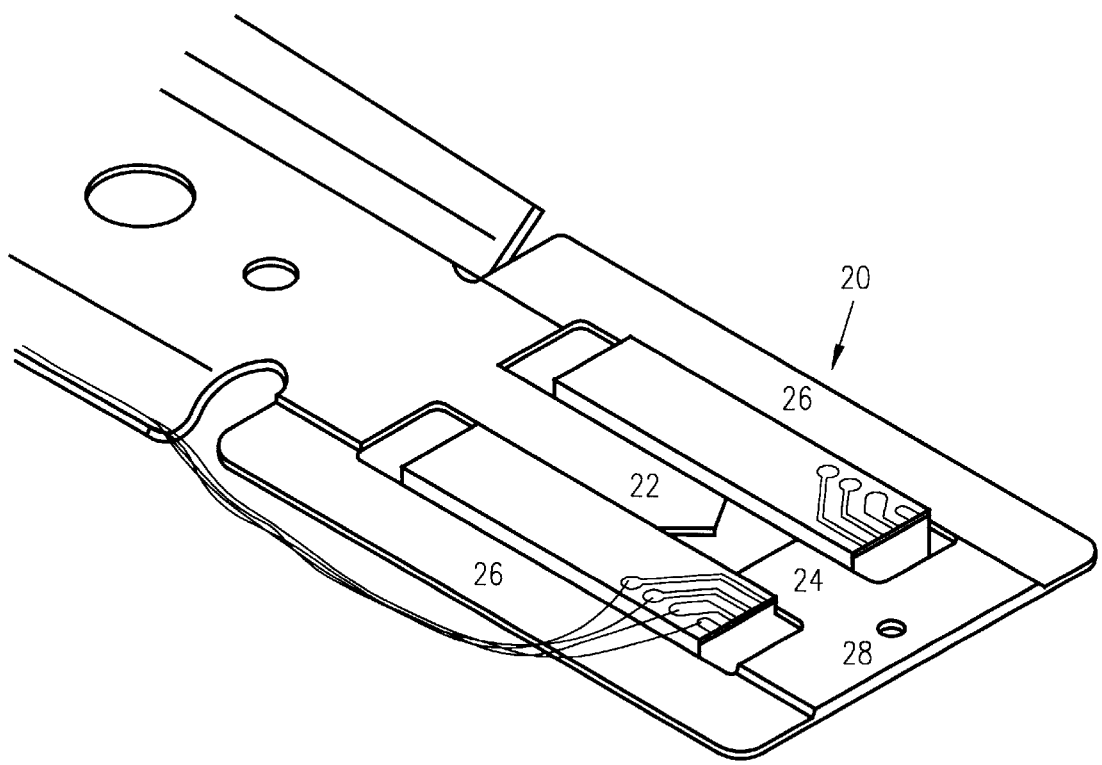
FIG. 1 is a perspective view of a gimbal and slider in accordance with the present invention.

With reference to the attached sketches, the preferred embodiment of the inventive HGA is one using a modification of the flexure of the incorporated applications which include a gimbal, a rigid beam, a compliant beam, and an attachment surface. The gimbal 20 includes a load point tab 22, a slider mounting tab 24, a pair of compliant gimbal beams 26, and a cross beam 28 connecting the pair of gimbal beams 26 and the slider mounting tab 24.

Figure 2:
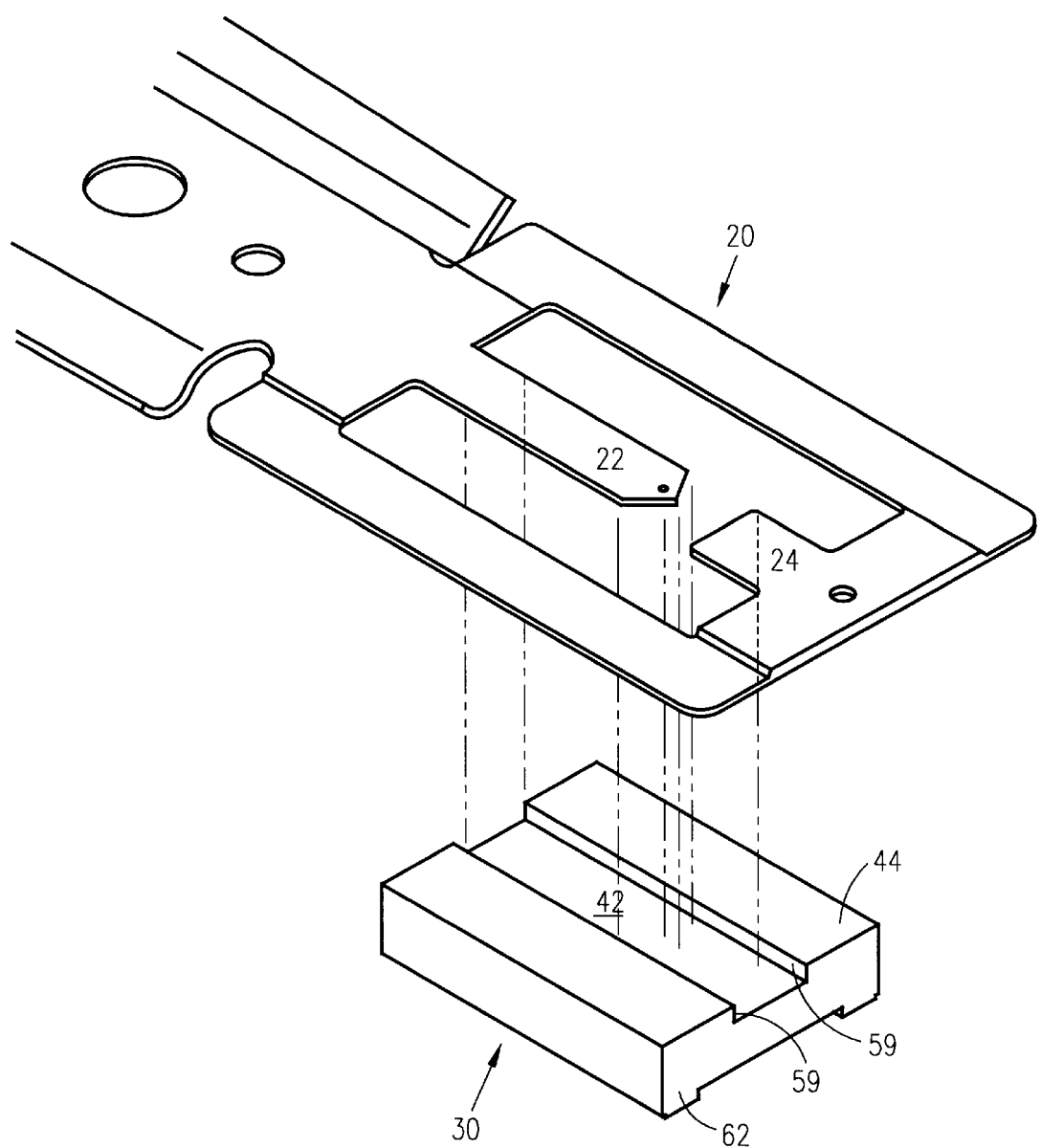
FIG. 2 is an exploded view of the slider-gimbal combination of FIG. 1.

Turning to FIG. 2, this flexure 20, often called the integrated support gimbal [ISG] flexure, or simply ISG, is used in conjunction with a slider 30 having a recess 42 of sufficient depth provided in its top surface 44 such that when the load point tab 22 and the slider mounting tab 24 are set in the recess, and the slider mounting tab 24 is attached adhesively during the HGA assembly process, the top of the flexure 20 is made flush with or is below the top surface of the slider.

Figure 3:
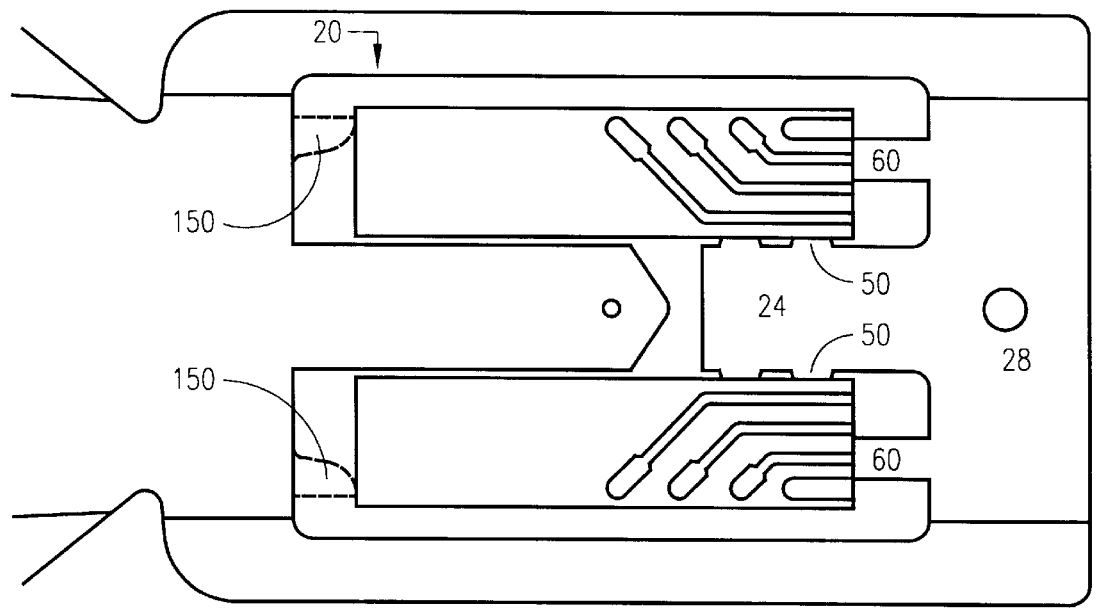
FIG. 3 is a top-plan view of the slider and gimbal, also illustrating alignment tabs.

Referring next to FIG. 3, the gimbal 20 is modified to include at least one lateral alignment tab 50 extending outward on both lateral sides of the slider mounting tab 24 and a pair of longitudinal alignment tabs 60 laterally disposed between the slider mounting tabs and the gimbal beams 26, extending inward from the cross beam 28. The lateral alignment tab(s) 50 contact an interior wall 59 (FIG. 2) of the recess, thereby providing alignment of the slider to the gimbal in the lateral direction. The longitudinal alignment tabs contact the trailing surface 62 of the slider 30 thereby providing alignment in the longitudinal direction.

The recess 42 is manufactured by a well-known machining process such as grinding, ion milling, or EDM. For a full thickness load point tab as in SEA8218, with a material thickness of 2.5 mils, and a mesa-shaped, load bearing protrusion with the free end surface 1.5 mils from the surface of the load point tab, the nominal recess depth would need to be a minimum of 4 mils.

Figure 4:
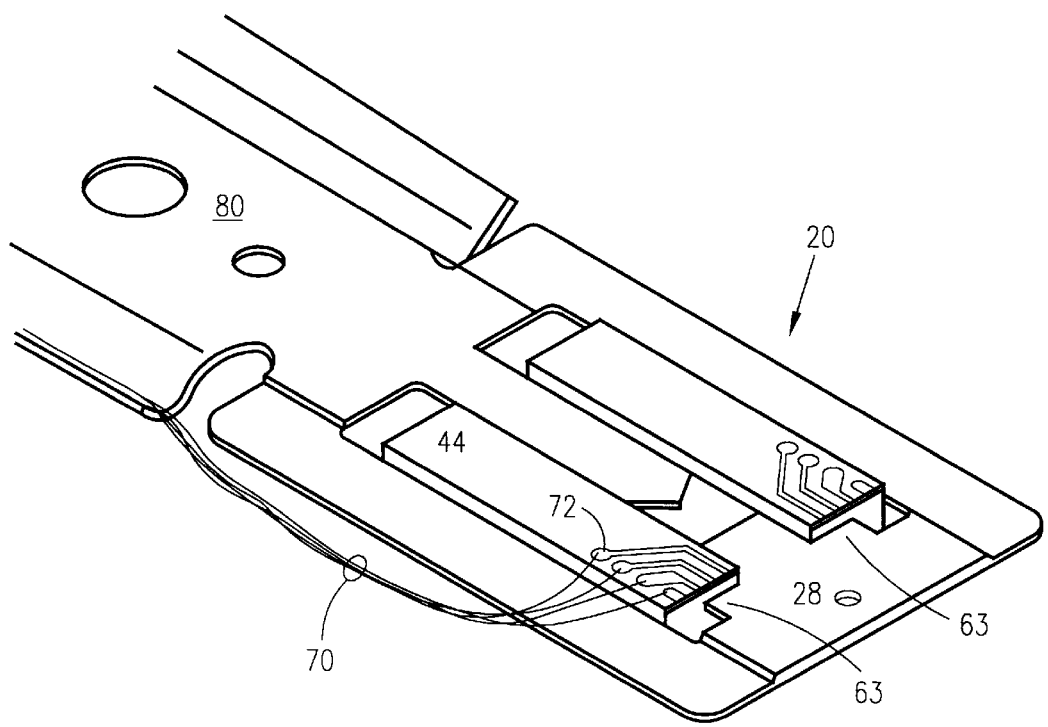
FIG. 4 is a perspective view of an alternative view of the alignment tabs shown in FIG. 3.

Because the gimbal 20 plane lies substantially below the top of the slider 30, it is not necessary to route wires 70, FIG. 4, which are attached to transducer termination points 72, with large vertical displacements to avoid contacting the gimbal, which significantly reduces the VSE. For example, in the case of transducer bond pads 72 on the top surface 44 of the slider 30, the wires can be routed in a substantially horizontal plane between the slider 30 and the load beam 80 resulting in a reduction of the VSE of approximately 35% from the prior art. The wires 70 are also precluded from contacting a disc surface in a hard disc file, thereby not posing a reliability risk. FIG. 4 further allows an alternative embodiment of the alignment tabs 60 shown in FIG. 3, as shown in FIG. 4, alignment tabs 63 are integrated with cross beam 28 and mounting tab 24, and are adjacent the longitudinal center line of the gimbal.

A second advantage of the inventive HGA with respect to having the gimbal plane below the top surface of the slider is that the unloaded and the loaded HGA heights are improved over the prior art. Per the teaching of the incorporated applications, the determining factor in minimizing the disc spacing in a hard disc file is the unloaded HGA height. The improvement is illustrated by comparing the stack-up dimensions for loaded and unloaded HGA heights for an HGA with the flexure of SEA8218 and the inventive HGA with a load point tab [LPT] width of 22 mils, both HGA's having a load force of 3.5 gmf.

| Factors | Prior Art | Inventive |
|---|---|---|
| Slider Thickness | 0.017 ± 0.001 | 0.017 ± 0.001 |
| Flexure Thickness | 0.00250 ± 0.00025 | 0.00250 ± 0.00025 |
| Loaded LPT Height | 0.0015 ± 0.0005 | 0.0015 ± 0.0005 |
| Unloaded LPT Height | 0.0016 ± 0.00 | 0.0019 ± 0.0005 |

The minimum, the maximum, and the nominal loaded and unloaded HGA heights for HGA's with the inventive flexure and with the prior art flexure are tabulated below.

|  | Prior Art | | Inventive | |
|---|---|---|---|---|
|  | Loaded | Unloaded | Loaded | Unloaded |
| Minimum | 0.01925 | 0.01935 | 0.01600 | 0.01640 |
| Nominal | 0.02100 | 0.02110 | 0.01700 | 0.01740 |
| Maximum | 0.02275 | 0.02285 | 0.01800 | 0.01840 |

A third advantage of the inventive HGA with respect to having the gimbal plane below the top surface of the slider is that the gimbal alignment tab features can be used to control the lateral and the longitudinal alignments of the slider to the gimbal, precluding the need for the assembly tooling to control the alignments. Such a use of the assembly tooling requires that the fabrication of the tooling reference features be done with great precision, which increases its cost. It is also necessary to maintain vigilantly the tools to sustain the precision through repeated use, further increasing the cost of such tooling. Aligning the slider to the gimbal solely with gimbal and with slider features allows for more simple, less costly assembly tooling.

A fourth advantage of the inventive HGA follows directly from precluding the use of external tooling to control slider to gimbal alignment, i.e., it improves the accuracy of positioning the load point protrusion with respect to the center of gravity of the slider. Aligning the slider to the gimbal with assembly tooling includes the accumulation of several tolerances, which reduces the alignment accuracy, associated with the gimbal, the slider, and the tooling reference points. The tolerances include: the load beam reference holes to the tooling reference features, the load beam reference holes to the gimbal reference holes [with non-integrated gimbals], the gimbal [or the load beam, with integrated gimbals] reference holes to the load point protrusion, the tooling reference features to the slider reference features, the location of the ABS on the bottom surface of the slider, and the slider body dimensions, such as length and width.

The accumulation of tolerances for the inventive HGA includes: the load beam reference holes to the load point protrusion, the load beam reference holes to the alignment tabs, the location of the ABS on the bottom surface of the slider, and the slider body dimensions. In the lateral direction there is an additional tolerance associated with the location of the recess on the top surface of the slider. Nevertheless, the accumulation of the tolerances with the inventive HGA is reduced significantly over the prior art. The reduction in the variance of the distance between the load point protrusion and the slider's center of gravity is approximately 30% in both the lateral and the longitudinal directions. In the case of the ST9420 product, this translates to an improvement in the variance of the fly height of the transducer, with respect to the disc, of approximately 8%.

Figure 5A:
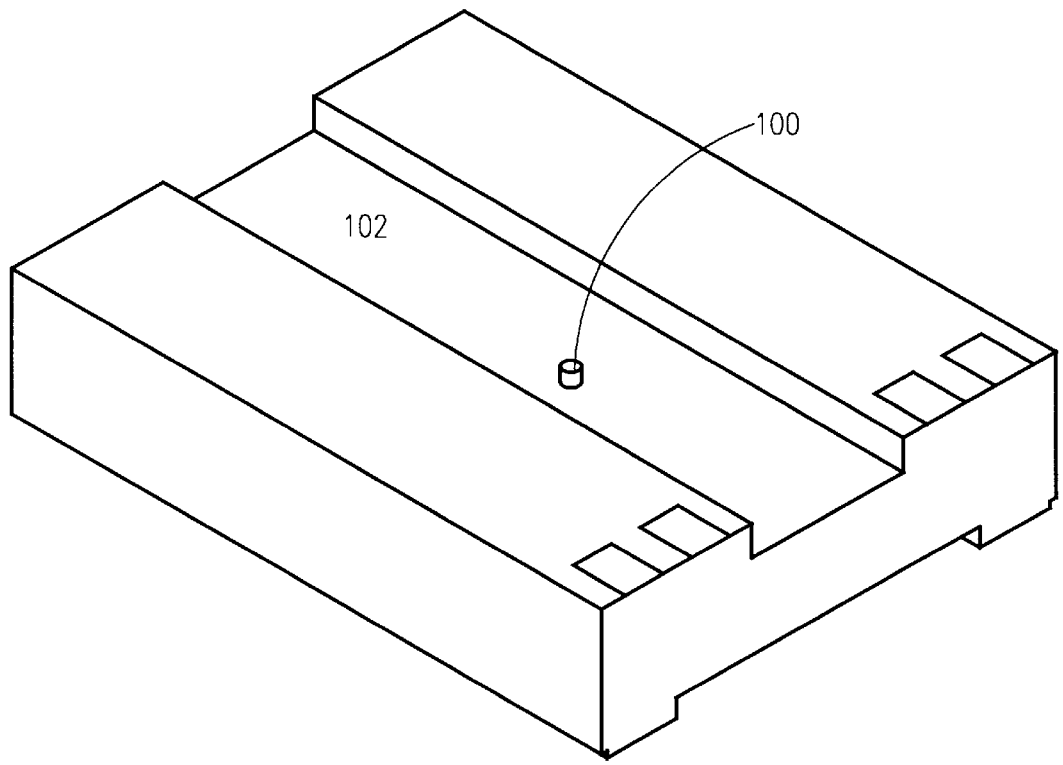
FIG. 5A is a perspective view of an alternative embodiment of a slider with a protrusion thereon.
Figure 5B:
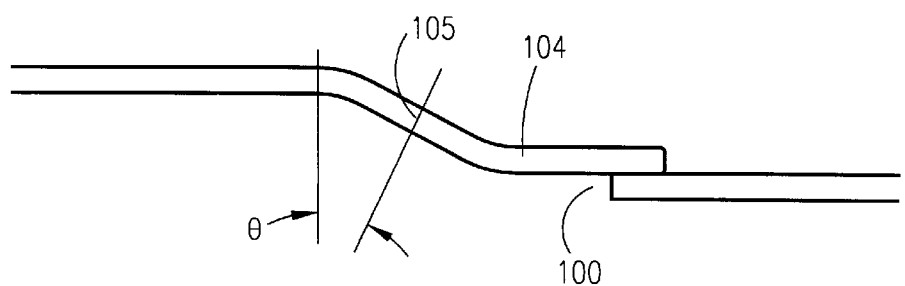
FIG. 5B is a vertical sectional view of an attachment of a gimbal to the slider of FIG. 5A.

The variance of the distance from the load point protrusion to the slider's center of gravity can be further reduced by defining the contact of the load point with the protrusion 100 located on the slider, rather than on the gimbal as shown in FIG. 5A and 5B. The protrusion placement can be referenced to transducer wafer features on the top surface of the slider. The ABS can be referenced similarly to the transducer pole tips, thereby providing a means for reducing the variance to substantially zero.

One embodiment includes ion milling the central region 102 top surface of the slider 30 such that the load point 100 protrusion, substantially centered in depressed region 102 between the side walls has a height of approximately 1.0 $\mu$. The half-etch region on the load point tab is eliminated to simplify the manufacturing of the gimbal. Clearance between the load point tab 104 and the top surface of the slider is provided by a simple form 105 near the end of the load point tab. This minimizes the required ion milling time and maintains the load point protrusion contact in the same plane as the gimbal beams to minimize the pitch and the roll stiffnesses and to prevent fretting at the point of load contact. This design also avoids undue pitch and roll stiffness.

There are additional advantages in positioning the longitudinal alignment tabs 60 such that they contact the slider on its trailing surface 62. In particular, the sensitivity of the fly height of the slider at the trailing edge, where the transducer is located, to the variation in slider length is improved. The fly height sensitivity to slider length has components that include the magnitude of the velocity of the slider with respect to the disc, the skew angle of the slider with respect to the tangential [or radial] component of the relative disc velocity, the longitudinal position of the load bearing protrusion with respect to the center of gravity of the slider, as well as the effect of the slider length itself on the slider fly height. By referencing the alignment of the slider at the trailing edge, as with the inventive HGA, rather than at the leading edge, as with the prior art configuration and the current assembly processes and tools, the sum of these effects is reduced. Moreover, this improvement is accentuated [greater than 50% reduction] at high skew angles, as is experienced by the slider when positioned near the outer diameter of the disc in a hard disc file such as the ST9420 product.

Another advantage in positioning the longitudinal alignment tabs at the trailing surface of the slider is that the HGA component of the variation in the distance from the head positioning actuator pivot in a hard disc file to the transducer mounted on the slider is reduced substantially to zero. This provides a greater control of the radial location of the transducer with respect to the disc, thereby improving the margins of such positioning and improving the performance of the hard disc file. The benefit of this improvement is magnified as the number of HGA's in a hard disc file increases.

A fifth advantage of the inventive HGA with respect to having the gimbal plane below the top surface of the slider is related to the dynamic performance of the HGA. With the gimbal plane below the top surface of the slider, the distance between the point of contact of the load point protrusion and the center of gravity of the slider is reduced substantially. Undesirable changes in the flying attitude of the slider can occur because of rapid accelerations of the head positioning actuator during a seek operation. External moments on the air bearing, e.g., in the roll and in the yaw directions, can be applied by the inertia of components, such as the slider, during such accelerations. The magnitude of these moments are generally proportional to the distance between the slider's center of gravity and the load point contact. When the actuator has ceased its movement, the slider will experience rotational and translational oscillations, which are enhanced by the inertial moments and which increase the access time of the hard disc file because the oscillations must attenuate before the transducer can be used for reading or writing. Because of the relatively low roll stiffness of the gimbal, the external roll moment is often the largest contributor to the translation of the transducer during a seek. It is also the external moment with the largest effect on the fly attitude of the slider.

Thus, the inventive HGA provides improved dynamic performance with respect to the prior art. A preferred embodiment locates the contact of the load point in the same horizontal plane as the center of gravity of the slider, thereby reducing the external roll moment to substantially zero. Moreover, these external moments can be minimized effectively by having the contact of the load point coincident with the center of gravity.

Figure 6A:
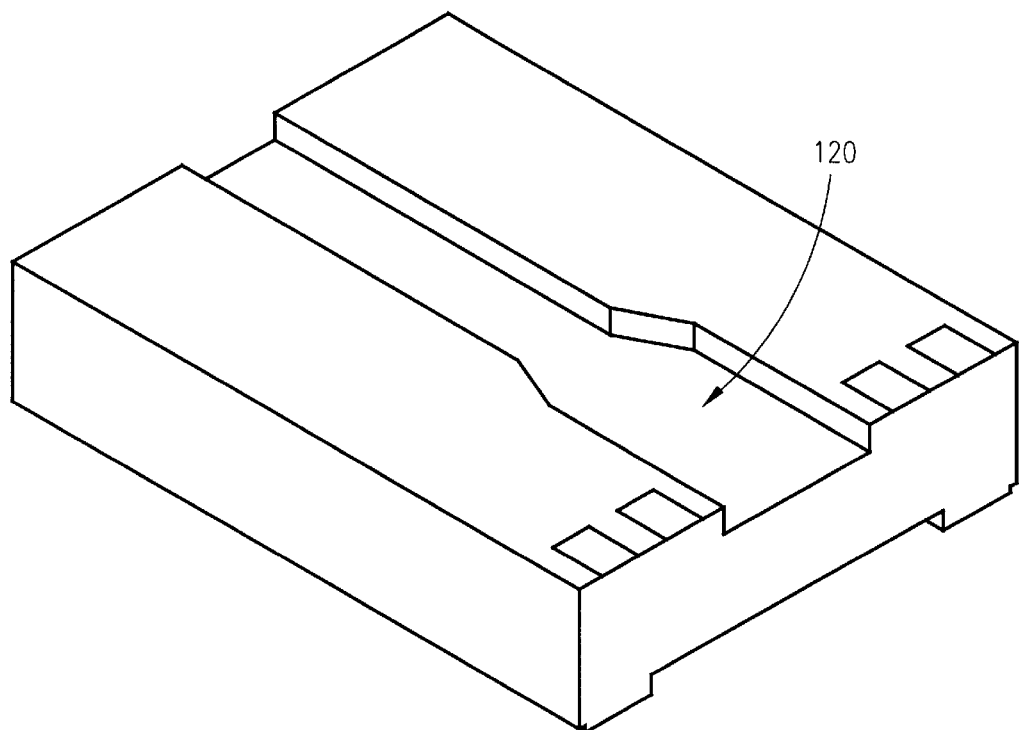
FIG. 6A and 6B show sliders having central depressed regions of varying configurations.
Figure 6B:
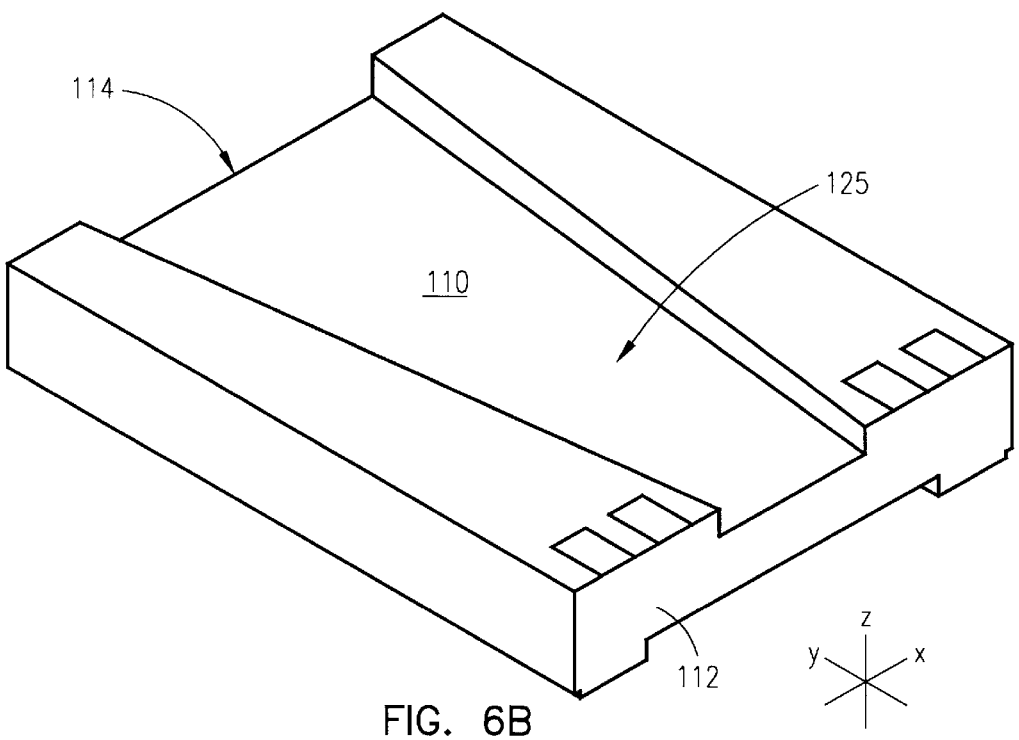

Note that the location of the slider's center of gravity is dependent largely upon the geometry of the recess, in particular, the width and the depth. The location of the center of gravity can be further manipulated by having the recess be of non-uniform width as shown in FIG. 6A at 120 or non-uniform depth as shown in FIG. 6B at 125. For example, in FIG. 6B, the slot 110 incorporates increases in depth from trailing edge 112 to leading edge 114. In one working example, utilizing a 50% slider, the following dimensions produced good results:

| | |
|---|---|
| Catamaran ABS Rail Widths | 11.0 mils |
| LE Taper | 10 mils, 8 mrad |
| LE Slot Width | 58 mils |
| TE Slot Width | 22 mils |
| Mean Slot Width | 40 mils |

-continued

| | |
|---|---|
| LE Slot Depth | 5.5 mils |
| TE Slot Depth | 2.5 mils |
| Mean Slot Depth | 4.0 mils |
| Slot Depth Angle | 2.15 deg |
| Dimple Tongue Thickness | 2.5 mils |
| Dimple Tongue Width at Base | 55 mils |
| Dimple Tongue Width at Load Point | 35.875 mils |
| Load Point Pitch Offset | 2.5 mils |
| Preload | 3.5 gmf |
| Gimbal Pitch Stiffness | 0.004 in·lb$_f$/rad |
| Resultant Roll Torque Moment Arm | 4.86 mils |
| Reduction from Prior Art | 35.2% |
| Resultant Yaw Torque Moment Arm | 0.04 mils |
| Reduction from Prior Art | 98.3% |

Such modifications can also be used to accommodate various gimbal geometries. Note also that the recess can be asymmetric with any principle axis or can be defined by any curvilinear surfaces.

As in the example above, the geometry of the recess can be used to adjust the pitch torque applied to the air bearing by adjusting the distance between the load point and the slider's center of gravity and by adjusting the static pitch angle of the slider with respect to the load beam, or the disc, when attached to the gimbal. It may be desirable to apply pitch torque to the air bearing such that the flying slope is increased, which has multiple advantages: the average slider flying height is increased, which reduces the disc topography contact area, contacts during radical dynamic excursions are reduced, damping during dynamic excursions is increased, stability during the transition from sliding to flying is increased while the disc is starting to rotate, the take-off velocity is reduced, and if the flying slope is increased without increasing the load point to the slider's center of gravity distance, then access time performance degradation is prevented.

Figure 7:
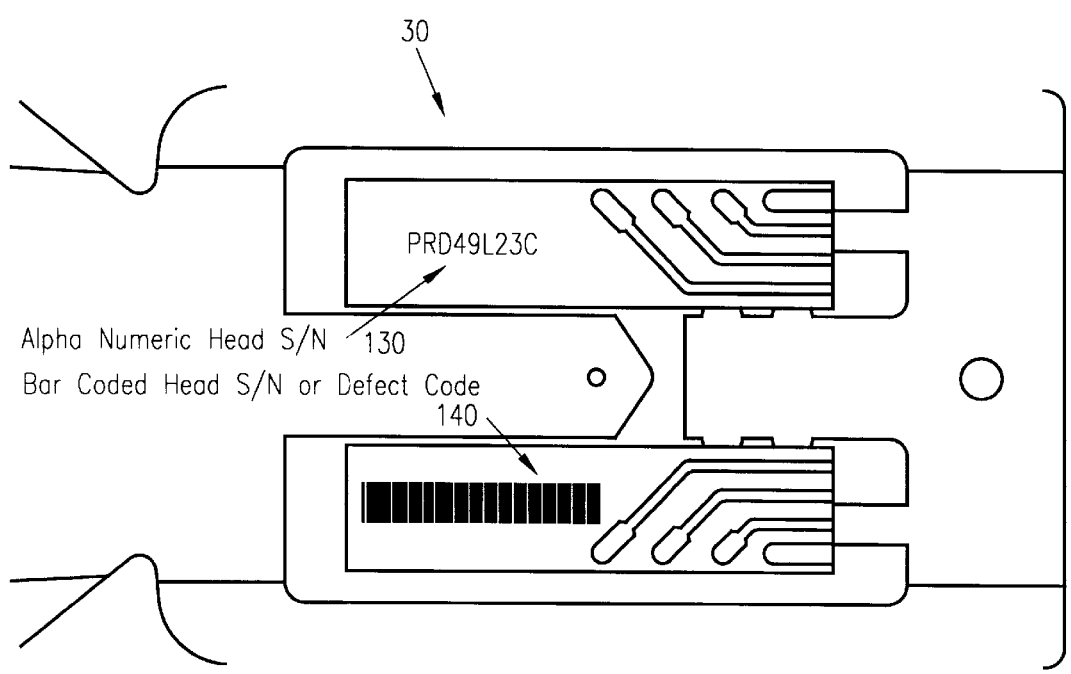
FIG. 7 illustrates a mode of scribing information on the top of a slider, according to the present invention.

There are also advantages for the inventive HGA that are realized because the width of the load point tab need not be, and can be substantially less than, the width of the slider. One such advantage is that the non-recessed portion of the top surface of the slider can be used to display information about the slider with laser scribing or some similar method as shown in FIG. 7. Such information could include an alphanumeric identifying S/N or defect code 130 on a top surface of slider 30. This information could also be bar-coded 140, for example, and could then be used downstream in the process for identification, sorting, screening, process monitoring, etc. Note that while some level of laser marking would have to be done on what would be the leading edge of an undiced bar of sliders, as with the current art, before the laser marking could be done on the top surface, the total amount of laser marking would need to increase less than 5% over the current process of the prior art.

In the HGA assembly and test process flow, it is necessary to identify individual HGA's. With a S/N 130 on the top surface, this can be done visually without having to move the HGA out of plane, which reduces handling and throughput. It is also more reliable than HGA's of the prior art because light is not reflected off the flexure and onto the S/N, thereby obscuring it. Also, because the S/N lies in the same plane as that in which the flexure and the slider are assembled, the identification scheme of the inventive HGA lends itself well to automated processes.

A second advantage of the inventive HGA, with respect to the load point tab having a width substantially less than that of the slider, is realized during the HGA assembly and test processes. During assembly and test, it is not uncommon for the ABS to become contaminated, which is undesirable. It is often necessary to remove this contamination with a contact cleaning process. Because there is not really a means of constraining the slider without distorting the gimbal, the end of the HGA is free during the ABS cleaning process. However, this still poses a significant risk to excessive gimbal damage. In the case of the inventive HGA with a TBP slider and with a load point tab having a width approximately one-third that of the slider, approximately 50% of the surface area on the top of the slider is available with which to use a simple support for the slider. Thus the slider can be constrained while the ABS is being cleaned without the gimbal being plastically deformed.

It should be obvious to someone experienced and skilled in the art of HGA design for hard disc files that many modifications to the preferred embodiment of the inventive HGA could be made without departing from the spirit of the invention. Such modifications include, but are not limited to, the geometry and manufacture of the recess and geometry and proportion of gimbal elements. For example, the alignment tabs 60 could be replaced by alignment tabs 150 (FIG. 3), shown in dotted line format); although the effectiveness would be somewhat diminished. Moreover, while all the embodiments discussed here pertain to the ISG suspension because its simple form is accommodated easily, the scope of this invention extends to other flexure configurations and the forms such configurations dictate.

Basically, the geometry of the slot can be used to adjust the pitch torque applied to the air bearing, per the discretion of the designer by adjusting the distance between the load point and the slider body's center of gravity and by adjusting the static pitch angle of the slider.

It is desirable to apply pitch torque to the air bearing; the fly slope is increased, which provides the following advantages:

1. Increase slider average fly height; reduce disk topography contact area.
2. Reduced contacts during radical dynamic excursions.
3. Increased damping during dynamic excursions.
4. Improved stability during transition from sliding to flying.
5. Reduced take-off velocity.
6. Increasing fly slope without increasing load point-center of gravity distance prevents access time performance degradation.

Also note that the form of the recess may be defined by curvilinear surfaces, or may be asymmetric.

Moreover, while all the embodiments shown here pertain to the ISG suspension because its simple form is easily accommodated, the spirit and slope of this concept extends to other gimbal configurations and the forms such configurations dictate.

The advantages that apply to top bond pad sliders also apply to HGA's with end bond pad sliders and the top wire route configuration.

Because the plane of the gimbal is below the top of the slider, the gimbal can be provided with reference contact points for the slider with which to control the alignment of the slider to the gimbal, thereby precluding need for assembly tooling to also function as control for alignment. The use of such tooling includes the accumulation of several tolerances, which reduces alignment accuracy. The references include:

1. Load beam reference holes to tooling alignment pins.
2. Load beam reference holes to gimbal reference holes [now-integrated gimbal].
3. Gimbal [or load beam] reference holes to gimbal dimple.
4. Tooling alignment pins [or tooling reference features] to slider reference.
5. Location of ABS on the slider.
6. Slider dimensions, i.e., length and width.

With the invention, Nos. 1,2,3,4 are reduced substantially to zero. For the roll alignment component, the tolerance for recess edge [slot] location and slider must be added. As a worst case, the slot position to tolerance is on the order of the tolerance for the location of ABS on the slider. Nevertheless, the accumulation of tolerances is dramatically reduced over the prior art.

It should also be noted with respect to the pitch alignment tabs that the primary first-order effect difference between locating the pitch alignment tabs at the leading edge or at the trailing edge is associated with the effect of slider length. Fly height sensitivity to slider length has components that include velocity, skew angle, load point pitch offset as well as the effect of slider length itself. Note that the effect of slider length is identical in manner for the prior art configuration assembled with the current process and tools and for the present invention with leading edge alignment tabs.

Also note that trailing edge alignment tabs have substantially zero contribution to variation in swing arm length [distance from actuator pivot to transducer gap], which provides greater control of the service track map in the disk drive.

It is clear that the exact position and geometry of the alignment tabs could be left to a designer well versed in the art while still being within the scope and the spirit of this concept.

Other features and advantages of the present invention will become apparent to a person of skill in the art who studies the above disclosure.

What is claimed is:

1. A flexure for supporting a slider for magnetic recording against a fluid bearing generated by relative motion between said slider and a moving magnetic surface, said flexure being formed from a single, contiguous piece of resilient material and comprising:

means for attaching said flexure to a mounting plate or head positioning support arm;

at least one compliant beam means attached at a first end to the attachment means and formed out of plane to exert a load force to oppose a hydrodynamic lifting force generated by the fluid bearing;

a rigid beam section attached at a second end of the compliant beam means to provide the load force of said compliant beam means to said slider; and a gimbal section, said gimbal section attached to said rigid beam section opposite the compliant beam means, said gimbal section including:

a load point tab proximal and extending from said rigid beam section;

a pair of compliant gimbal beams laterally displaced from said load point tab and having first ends attached near the base of said load point tab, said gimbal beams being partially etched;

a cross member connecting second ends of said gimbal beams;

a slider mounting tab attached to the cross member and extending toward said load point tab, having the free end of said slider mounting tab being longitudinally displaced from the free end of said load point tab, said slider mounting tab having, over at least a part of its length, a width approximately one-third of the width of the slider whereby approximately one-third of the width of the slider on either side of said slider mounting tab is unobstructed by said slider mounting tab in a top plan view;

at least one lateral alignment tab means attached to at least one lateral side of said slider mounting tab, said lateral alignment tab means extending laterally toward and displaced laterally from at least one of said gimbal beams, thereby providing lateral alignment of the slider to said gimbal section when in contact with a first surface of the slider, a component of the normal of said first surface being in an opposite direction as an extension of said lateral alignment tab means; and at least one longitudinal alignment tab means attached to said cross member, said longitudinal alignment tab means being laterally disposed between said slider mounting tab and at least one of said gimbal beams, said longitudinal alignment tab means extending longitudinally toward and displaced longitudinally from said load point tab, thereby providing longitudinal alignment of the slider to said gimbal section when in contact with a second surface of the slider, a component of the normal of said second surface being in an opposite direction as an extension of said longitudinal alient tab means.

2. An assembly for magnetic recording on a magnetic surface comprising:

a flexure for supporting a slider for magnetic recording against a fluid bearing generated by relative motion between said slider and a moving magnetic surface, said flexure being formed from a single, contiguous piece of resilient material and comprising:

means for attaching said flexure to a mounting plate or head positioning support arm;

at least one compliant beam means attached at a first end to the attachment means and formed out of plane to exert a load force to oppose a hydrodynamic lifting force generated by the fluid bearing;

a rigid beam section attached at a second end of the compliant beam means to provide the load force of said compliant beam means to said slider; and a gimbal section, said gimbal section attached to said rigid beam section opposite the compliant beam means, said gimbal section including:

a load point tab proximal and extending from said rigid beam section;

a pair of compliant gimbal beams laterally displaced from said load point tab and having first ends attached near the base of said load point tab, said gimbal beams being partially etched;

a cross member connecting second ends of said gimbal beams;

a slider mounting tab attached to the cross member and extending toward said load point tab, having the free end of said slider mounting tab being longitudinally displaced from the free end of said load point tab, said slider mounting tab having, over at least a part of its length, a width approximately one-third of the width of the slider whereby approximately one-third of the width of the slider on either side of said slider mounting tab is unobstructed by said slider mounting tab in a top plan view;

at least one lateral alignment tab means attached to at least one lateral side of said slider mounting tab, said lateral alignment tab means extending laterally toward and displaced laterally from at least one of said gimbal beams, thereby providing lateral alignment of the slider to said gimbal section when in contact with a first surface of the slider, a component of the normal of said first surface being in an opposite direction as an extension of said lateral alignment tab means; and at least one longitudinal alignment tab means attached to said cross member, said longitudinal alignment tab means being laterally disposed between said slider mounting tab and at least one of said gimbal beams, said longitudinal alignment tab means extending longitudinally toward and displaced longitudinally from said load point tab, thereby providing longitudinal alignment of the slider to said gimbal section when in contact with a second surface of the slider, a component of the normal of said second surface being in an opposite direction as an extension of said longitudinal alignment tab means;

said slider mounted on said slider mounting tab where said slider is located substantially centrally with respect to said gimbal section, said slider including:

a bottom surface that generates the fluid bearing by relative motion between said slider and a moving magnetic surface;

a transducer mounted to the trailing surface and proximate the bottom surface of said slider as a means for reading stored data from and writing data for storage to a magnetic surface;

a recess substantially centered laterally on the top surface and extending from the leading surface to the trailing surface of said slider;

wherein said load point tab and said slider mounting tab are located within said recess such that the top surface of said flexure is displaced vertically below the top surface of said slider;

said compliant gimbal beams are laterally displaced such that there is lateral clearance between the side edges of said slider and said compliant gimbal beams;

a load bearing protrusion on said load point tab contacts directly on said slider on the bottom surface of said recess;

at least one of said lateral alignment tab means contacts directly on an interior wall of said recess as a means of alignment reference in the lateral direction; and said longitudinal alignment tab means contact directly on the trailing surface of said slider as a means of alignment reference in the longitudinal direction.

3. An assembly as in claim 2, wherein said load point tab has, proximate its distal end, a region of reduced material thickness forming the load bearing protrusion substantially centered in the region of reduced material thickness.

4. An assembly as in claim 2, wherein said load point tab is formed out of plane such that said load bearing protrusion will be substantially coplanar with said rigid beam section when the flexure is loaded against a magnetic surface.

5. An assembly as in claim 2, wherein said longitudinal alignment tab means are contiguous with said slider mounting tab.

6. An assembly as in claim 2, wherein said recess is substantially prismatic.

7. An assembly as in claim 6, wherein the point of contact between said load bearing protrusion and said slider is substantially in the same horizontal plane as the center of gravity of said slider, when said assembly is loaded against a magnetic surface.

8. An assembly as in claim 7, wherein the point of contact between said load bearing protrusion and said slider is substantially coincident with the center of gravity of said slider, when said assembly is loaded against a magnetic surface.

9. An assembly as in claim 2, wherein said recess varies in depth along its length.

10. An assembly as in claim 9, wherein the point of contact between said load bearing protrusion and said slider is substantially in the same horizontal plane as the center of gravity of said slider, when said assembly is loaded against a magnetic surface.

11. An assembly as in claim 10, wherein the point of contact between said load bearing protrusion and said slider is substantially coincident with the center of gravity of said slider, when said assembly is loaded against a magnetic surface.

12. An assembly as in claim 2, wherein said recess varies in width along its length.

13. An assembly as in claim 12, wherein the point of contact between said load bearing protrusion and said slider is substantially in the same horizontal plane as the center of gravity of said slider, when said assembly is loaded against a magnetic surface.

14. An assembly as in claim 13, wherein the point of contact between said load bearing protrusion and said slider is substantially coincident with the center of gravity of said slider, when said assembly is loaded against a magnetic surface.

15. An assembly as in claim 2, wherein an identifying code is provided on a non-recessed portion of the top surface of said slider such that said identifying code is not obstructed by said gimbal section in a top plan view.

16. An assembly as in claim 2, wherein transducer termination points for wires connected to read/write electronics of a hard disc file direct access storage device are provided on a non-recessed portion of the top surface of said slider.

17. An assembly as in claim 2, wherein transducer termination points for wires connected to read/write electronics of a hard disc file direct access storage device are provided on the trailing surface of said slider.

18. An assembly as in claim 2, wherein a region proximate the distal end of the load point tab of said gimbal section is formed out of plane, thereby providing clearance between the base of the load point tab and the slider when said region is in contact with a surface on the top of the slider.

19. A flexure as in claim 18, wherein said load point tab is formed out of plane such that the out of plane region proximate the distal end of the load point tab will be substantially coplanar with said rigid beam section when the flexure is loaded against a magnetic surface.

20. An assembly for magnetic recording on a magnetic surface comprising:
a flexure for supporting a slider for magnetic recording against a fluid bearing generated by relative motion between said slider and a moving magnetic surface, said flexure being formed from a single, contiguous piece of resilient material and comprising:
means for attaching said flexure to a mounting plate or head positioning support arm;
at least one compliant beam means attached at a first end to the attachment means and formed out of plane to exert a load force to oppose a hydrodynamic lifting force generated by the fluid bearing;
a rigid beam section attached at a second end of the compliant beam means to provide the load force of said compliant beam means to said slider; and
a gimbal section, said gimbal section attached to said rigid beam section opposite the compliant beam means, said gimbal section including:
a load point tab proximal and extending from said rigid beam section;
a pair of compliant gimbal beams laterally displaced from said load point tab and having first ends attached near the base of said load point tab, said gimbal beams being partially etched;
a cross member connecting second ends of said gimbal beams;
a slider mounting tab attached to the cross member and extending toward said load point tab, having the free end of said slider mounting tab being longitudinally displaced from the free end of said load point tab, said slider mounting tab having, over at least a part of its length, a width approximately one-third of the width of the slider whereby approximately one-third of the width of the slider on either side of said slider mounting tab is unobstructed by said slider mounting tab in a top plan view;
at least one lateral alignment tab means attached to at least one lateral side of said slider mounting tab, said lateral alignment tab means extending laterally toward and displaced laterally from at least one of said gimbal beams, thereby providing lateral alignment of the slider to said gimbal section when in contact with a first surface of the slider, a component of the normal of said first surface being in an opposite direction as an extension of said lateral alignment tab means; and
at least one longitudinal alignment tab means attached to said cross member, said longitudinal alignment tab means being laterally disposed between said slider mounting tab and at least one of said gimbal beams, said longitudinal alignment tab means extending longitudinally toward and displaced longitudinally from said load point tab, thereby providing longitudinal alignment of the slider to said gimbal section when in contact with a second surface of the slider, a component of the normal of said second surface being in an opposite direction as an extension of said longitudinal alignment tab means;
said slider for magnetic recording comprising:
a bottom surface that generates the fluid bearing by relative motion between said slider and a moving magnetic surface;
a recess on the top surface for which at least one gimbal member of the gimbal section is located and where said slider is attached to the gimbal section of the flexure, thereby providing a means of accurately positioning said slider with respect to a magnetic surface; and
a load bearing protrusion that rises out of the bottom surface of said recess;
wherein said slider is mounted on said slider mounting tab and said slider is located substantially centrally with respect to said gimbal section, said slider further including a transducer mounted to the trailing surface and proximate the bottom surface of said slider as a means for reading stored data from and writing data for storage to a magnetic surface, wherein:
said load point tab and said slider mounting tab are located within said recess such that the top surface of said flexure is displaced vertically below the top surface of said slider;

said compliant gimbal beams are laterally displaced such that there is lateral clearance between the side edges of said slider and said compliant gimbal beams;

said load bearing protrusion contacts directly on the out of plane region proximate the distal end of said load point tab;

at least one of said lateral alignment tab means contacts directly on an interior wall of said recess as a means of alignment reference in the lateral direction; and said longitudinal alignment tab means contact directly on the trailing surface of said slider as a means of alignment reference in the longitudinal direction.

21. A slider as in claim 20, wherein the top surface of said load bearing protrusion is substantially in the same horizontal plane as the center of gravity of said slider, when said slider is loaded against a magnetic surface.

22. A slider as in claim 20, wherein the top surface of said load bearing protrusion is substantially coincident with the center of gravity of said slider, when said assembly is loaded against a magnetic surface.

23. A slider as in claim 20, wherein said recess varies in depth along its length.

24. A slider as in claim 23, wherein the top surface of said load bearing protrusion is substantially in the same horizontal plane as the center of gravity of said slider, when said slider is loaded against a magnetic surface.

25. A slider as in claim 24, wherein the top surface of said load bearing protrusion is substantially coincident with the center of gravity of said slider, when said assembly is loaded against a magnetic surface.

26. A slider as in claim 31, wherein said recess varies in width along its length.

27. A slider as in claim 26, wherein the top surface of said load bearing protrusion is substantially in the same horizontal plane as the center of gravity of said slider, when said slider is loaded against a magnetic surface.

28. A slider as in claim 27, wherein the top surface of said load bearing protrusion is substantially coincident with the center of gravity of said slider, when said assembly is loaded against a magnetic surface.

29. A slider as in claim 20, wherein said recess is substantially centered laterally on the top surface and extends from the leading surface to the trailing surface of said slider.

30. A slider as in claim 20, wherein said recess is substantially prismatic.

31. An assembly as in claim 20, wherein transducer termination points for wires connected to read/write electronics of a hard disc file direct access storage device are provided on the trailing surface of said slider.

32. An assembly as in claim 20, wherein an identifying code is provided on a non-recessed portion of the top surface of said slider such that said identifying code is not obstructed by said gimbal section in top plan view.

33. An assembly as in claim 20, wherein transducer termination points for wires connected to read/write electronics of a hard disc file direct access storage device are provided on a non-recessed portion of the top surface of said slider.

34. A flexure for supporting a slider for magnetic recording against a fluid bearing generated by relative motion between said slider and a moving magnetic surface, said flexure comprising:

means for attaching said flexure to a mounting plate or head positioning support arm;

at least one compliant beam means attached at a first end to the attachment means and formed out of plane to exert a load force to oppose a hydrodynamic lifting force generated by the fluid bearing;

a rigid load beam section attached at a second end of the compliant beam means to said slider;

a gimbal section, said gimbal section attached to said rigid load beam section opposite the compliant beam means, said gimbal section including:

a pair of compliant gimbal beams laterally displaced from a longitudinal center of said load beam section and having first ends attached near the base of attachment with said load beam section;

a cross member connecting second ends of said gimbal beams, said cross member having a portion of its length in a plane that is offset from the plane defined by said gimbal beams;

a gimbal bond tongue attached to the cross member and extending from said offset portion of said cross member and toward said load beam section, said gimbal bond tongue having a free end, said gimbal bond tongue having a width approximately one-third of the width of the slider, whereby approximately one-third of the width of the slider on either side of said gimbal bond tongue is unobstructed by said gimbal bond tongue in a top plan view;

at least one lateral alignment tab means attached to at least one lateral side of said gimbal bond tongue, said lateral alignment tab means extending laterally toward and displaced laterally from at least one of said gimbal beams, thereby providing lateral alignment of the slider to said gimbal section when in contact with a first surface of the slider, a component of the normal of said first surface being in an opposite direction as an extension of said lateral alignment tab means;

at least one longitudinal alignment tab means attached to the offset portion of said cross member, said longitudinal alignment tab means being laterally disposed between said gimbal bond tongue and at least one of said gimbal beams, said longitudinal alignment tab means extending longitudinally toward said load beam section, thereby providing longitudinal alignment of the slider to said gimbal section when in contact with a second surface of the slider, a component of the normal of said second surface being in an opposite direction as an extension of said longitudinal alignment tab means; and a load bearing protrusion rising out of said gimbal bond tongue and positioned between said load beam section and said gimbal bond tongue, wherein said gimbal bond tongue is offset a distance from said gimbal beams such that the height of said load bearing protrusion is substantially equal to the amount of the offset and the point of contact between said load bearing protrusion and said load beam section lies substantially in the same plane as that defined by said gimbal beams.

35. An assembly for magnetic recording on a magnetic surface comprising:

a flexure for supporting a slider for magnetic recording against a fluid bearing generated by relative motion between said slider and a moving magnetic surface, said flexure comprising:

means for attaching said flexure to a mounting plate or head positioning support arm;

at least one compliant beam means attached at a first end to the attachment means and formed out of plane to exert a load force to oppose a hydrodynamic lifting force generated by the fluid bearing;

a rigid load beam section attached at a second end of the compliant beam means to said slider;

a gimbal section, said gimbal section attached to said rigid load beam section opposite the compliant beam means, said gimbal section including:

a pair of compliant gimbal beams laterally displaced from a longitudinal center of said load beam section and having first ends attached near the base of attachment with said load beam section;

a cross member connecting second ends of said gimbal beams, said cross member having a portion of its length in a plane that is offset from the plane defined by said gimbal beams;

a gimbal bond tongue attached to the cross member and extending from said offset portion of said cross member and toward said load beam section, said gimbal bond tongue having a free end, said gimbal bond tongue having a width approximately one-third of the width of the slider, whereby approximately one-third of the width of the slider on either side of said gimbal bond tongue is unobstructed by said gimbal bond tongue in a top plan view;

at least one lateral alignment tab means attached to at least one lateral side of said gimbal bond tongue, said lateral alignment tab means extending laterally toward and displaced laterally from at least one of said gimbal beams, thereby providing lateral alignment of the slider to said gimbal section when in contact with a first surface of the slider, a component of the normal of said first surface being in an opposite direction as an extension of said lateral alignment tab means;

at least one longitudinal alignment tab means attached to the offset portion of said cross member, said longitudinal alignment tab means being laterally disposed between said gimbal bond tongue and at least one of said gimbal beams, said longitudinal alignment tab means extending longitudinally toward said load beam section, thereby providing longitudinal alignment of the slider to said gimbal section when in contact with a second surface of the slider, a component of the normal of said second surface being in an opposite direction as an extension of said longitudinal alignment tab means; and a load bearing protrusion rising out of said gimbal bond tongue and positioned between said load beam section and said gimbal bond tongue, wherein said gimbal bond tongue is offset a distance from said gimbal beams such that the height of said load bearing protrusion is substantially equal to the amount of the offset and the point of contact between said load bearing protrusion and said load beam section lies substantially in the same plane as that defined by said gimbal beams;

said slider mounted on said gimbal bond tongue where said slider is located substantially centrally with respect to said gimbal section, said slider including:

a bottom surface that generates the fluid bearing by relative motion between said slider and a moving magnetic surface;

a transducer mounted to the trailing surface and proximate the bottom surface of said slider as a means for reading stored data from and writing data for storage to a magnetic surface; and a recess substantially centered laterally on the top surface, wherein:

said gimbal bond tongue is located within said recess such that the top surface of said flexure is displaced vertically below the top surface of said slider;

said compliant gimbal beams are laterally displaced such that there is lateral clearance between the side edges of said slider and said compliant gimbal beams;

at least one of said lateral alignment tab means contacts directly on an interior wall of said recess as a means of alignment reference in the lateral direction; and said longitudinal alignment tab means contact directly on the trailing surface of said slider as a means of alignment reference in the longitudinal direction.

36. An assembly as in claim 35, wherein transducer termination points for wires connected to read/write electronics of a hard disc file direct access storage device are provided on the trailing surface of said slider.

37. An assembly as in claim 35, wherein the point of contact between said load bearing protrusion and said load beam section is substantially in the same horizontal plane as the center of gravity of said slider, when said assembly is loaded against a magnetic surface.

38. An assembly as in claim 37, wherein the point of contact between said load bearing protrusion and said load beam section is substantially coincident with the center of gravity of said slider, when said assembly is loaded against a magnetic surface.

39. An assembly as in claim 35, wherein an identifying code is provided on a non-recessed portion of the top surface of said slider such that said identifying code is not obstructed by said gimbal section in top plan view.

40. An assembly as in claim 35, wherein transducer termination points for wires connected to read/write electronics of a hard disc file direct access storage device are provided on a non-recessed portion of the top surface of said slider.

* * * * *